(12) United States Patent
Clark

(10) Patent No.: US 7,503,346 B1
(45) Date of Patent: Mar. 17, 2009

(54) SOLENOID ACTUATED PILOT VALVE FOR IRRIGATION SYSTEM VALVE

(75) Inventor: Michael L. Clark, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 265 days.

(21) Appl. No.: 11/472,964

(22) Filed: Jun. 21, 2006

(51) Int. Cl.
*F15B 13/043* (2006.01)

(52) U.S. Cl. ............................. 137/625.64; 137/625.27; 137/625.65

(58) Field of Classification Search ............ 137/625.25, 137/625.27, 625.64, 625.65
See application file for complete search history.

(56) References Cited

U.S. PATENT DOCUMENTS

| | | | | | |
|---|---|---|---|---|---|
| 75,736 | A | * | 3/1868 | Cooper | 142/15 |
| 672,078 | A | * | 4/1901 | Harrington | 137/625.27 |
| 780,754 | A | * | 1/1905 | Junggren | 137/625.27 |
| 2,328,902 | A | * | 9/1943 | Grove | 137/625.27 |
| 2,624,585 | A | * | 1/1953 | Churchill et al. | 137/625.27 |
| 2,812,776 | A | * | 11/1957 | Lofftus et al. | 137/625.27 |
| 2,886,377 | A | * | 5/1959 | Martin | 137/625.27 |
| 3,022,799 | A | * | 2/1962 | Padula | 137/625.65 |
| 3,092,145 | A | * | 6/1963 | Brinkel | 137/625.65 |
| 3,111,960 | A | * | 11/1963 | Marmo | 137/625.5 |
| 3,145,064 | A | * | 8/1964 | Billeter et al. | 137/625.27 |
| 3,316,731 | A | * | 5/1967 | Quick | 137/601.13 |
| 3,538,954 | A | * | 11/1970 | Bowsher et al. | 137/625.65 |
| 3,613,733 | A | * | 10/1971 | Machek | 137/625.65 |
| 3,951,378 | A | * | 4/1976 | Manor | 137/625.65 |
| 3,977,438 | A | * | 8/1976 | Muchow et al. | 137/625.27 |
| 4,023,588 | A | * | 5/1977 | Olander | 137/625.27 |
| 4,074,700 | A | * | 2/1978 | Engle | 137/625.27 |
| 4,270,504 | A | * | 6/1981 | Sciotti et al. | 137/625.27 |
| 4,494,573 | A | * | 1/1985 | Berte | 137/625.65 |
| 4,531,547 | A | * | 7/1985 | Hadden | 137/625.64 |
| 4,734,201 | A | * | 3/1988 | Watanabe | 137/625.27 |
| 4,766,933 | A | * | 8/1988 | Champseix et al. | 137/625.5 |
| 4,821,774 | A | * | 4/1989 | Chorkey | 137/625.65 |
| 4,848,727 | A | * | 7/1989 | Nanbu et al. | 137/625.65 |
| 5,007,447 | A | * | 4/1991 | Penitot et al. | 137/625.27 |
| 5,190,076 | A | * | 3/1993 | Kloehn | 137/625.5 |
| 5,671,774 | A | | 9/1997 | Klein et al. | 137/486 |
| 5,979,482 | A | | 11/1999 | Scott | 137/15 |
| 6,079,437 | A | | 6/2000 | Beutler et al. | 137/181 |
| 6,843,465 | B1 | * | 1/2005 | Scott | 251/129.06 |
| 2004/0211477 | A1 | * | 10/2004 | Ezaki et al. | 137/877 |

OTHER PUBLICATIONS

Pilot Valve Drawing, Grizzle & Hunter SBH 086, 2004 (1 page).

* cited by examiner

*Primary Examiner*—John Rivell
*Assistant Examiner*—Craig Price
(74) *Attorney, Agent, or Firm*—Michael H. Jester

(57) ABSTRACT

A solenoid actuated pilot valve includes a pilot valve housing defining a pilot valve chamber and a solenoid. The solenoid includes and end cap connected to the pilot valve housing, a reciprocable plunger, and a piston having a shaft with a first end connected to and end of the plunger and a second end connected to a piston head. The end cap has a bore through which the shaft of the piston reciprocates and a first port separate from the bore. A first seal on a first side of the piston head is provided for sealing a first end of the first port. A second seal on a second side of the piston head is provided for sealing a first end of a second port in the pilot valve housing.

10 Claims, 5 Drawing Sheets

SOLENOID ACTUATED PILOT VALVE FOR IRRIGATION SYSTEM VALVE

FIELD OF THE INVENTION

The present invention relates to valves used to control the flow of liquids, and more particularly, to solenoid operated valves typically used to turn ON and OFF the flow of water in residential and commercial irrigation systems.

BACKGROUND OF THE INVENTION

In a typical irrigation system a manually programmable electronic controller selectively energizes a solenoid operated valve to cause pressurized water to be delivered to a set of sprinklers connected to a common buried PVC pipe. Each set of sprinklers is referred to as a station or zone and is supplied with pressurized water by a corresponding solenoid actuated valve. The solenoid actuated valve typically has a clam shell or bonnet configuration exemplified in U.S. Pat. No. 6,079,437 granted Jun. 27, 2000 to Beutler et al. and assigned to Hunter Industries, Inc. In a bonnet valve, pressurized upstream or inlet water passes via a small metering orifice in a central metering body to a control chamber inside the upper clam shell on the back side of a circular elastomeric diaphragm to apply a closing pressure. This forces the periphery of a valve member connected to the diaphragm against a valve seat. Water can be vented from the control chamber through a small pilot valve passage which is opened by a solenoid actuated pilot valve, which causes the diaphragm and valve member to move upwardly and allow water to flow freely through the main flow passage of the valve.

Another type of valve used in industrial and agricultural applications, but not in residential and commercial irrigation systems, is known as a sleeve valve and is exemplified in U.S. Pat. No. 5,671,774 granted Sep. 30, 1997 to Klein et al. and assigned to Nelson Irrigation Corporation. In a sleeve valve, a substantially cylindrical elastomeric sleeve is surrounded by an outer cylindrical rigid housing to define a control chamber between the elastomeric sleeve and housing. The ends of the elastomeric sleeve overlap a mandrel including opposing frusto-conical sections having circumferentially spaced slots. A solenoid operated pilot valve can release pressurized water from a control chamber to allow the elastomeric sleeve to expand and uncover the slots, thereby allowing water to flow freely through the main flow passage of the sleeve valve.

A two-way solenoid actuated pilot valve typically includes a solenoid whose spring biased plunger moves an elastomeric seal. When the solenoid is de-energized the plunger pushes the elastomeric seal against a pilot valve seat in a pilot valve chamber, closing a passage that leads from the control chamber of the main valve. This closes the main valve. When the solenoid is energized, the plunger retracts and the elastomeric seal moves away from the pilot valve seat, allowing pressurized liquid to leave the control chamber through the passage, through the pilot valve chamber and through a relief passage into the outlet of the main valve. This opens the main valve. See U.S. Pat. No. 5,979,482 granted Nov. 9, 1999 to Scott and assigned to Hunter Industries, Inc.

A three-way solenoid actuated pilot valve is used to switch between two different sources and a common destination, and visa versa. An elastomeric seal is moved against a first pilot valve seat when the plunger is retracted and against a second pilot valve seat when the plunger is extended. Valves used in residential and commercial irrigation systems have used three way solenoid actuated pilot valves. The power supplied to solenoid actuated valves used in residential and commercial irrigation systems is relatively low. This necessitates the use of relatively small pins and seals in three way solenoid actuated pilot valves that are expensive to manufacture and assemble. These delicate components require significant precision for reliable operation and they are prone to breakage.

SUMMARY OF THE INVENTION

In accordance with one aspect of the present invention, a three-way solenoid actuated pilot valve sub-assembly has a solenoid having an end configured for insertion into a pilot valve housing and includes a longitudinally extending member reciprocable through the end of the solenoid and a laterally projecting member reciprocable within a pilot valve chamber of the pilot valve housing. A first seal on a first side of the laterally projecting member is capable of sealing a first end of a first port in the end of the solenoid spaced laterally from the longitudinally extending member. A second seal on a first side of the longitudinally extending member or on a second side of the laterally projecting member is capable of sealing a first end of a second port in the pilot valve housing that communicates with the pilot valve chamber.

In accordance with another aspect of the present invention, a solenoid actuated pilot valve includes a pilot valve housing defining a pilot valve chamber and a solenoid. The solenoid includes and end cap connected to the pilot valve housing, a reciprocable plunger, and a piston having a shaft with a first end connected to and end of the plunger and a second end connected to a piston head. The end cap has a bore through which the shaft of the piston reciprocates and a first port separate from the bore. A first seal on a first side of the piston head is provided for sealing a first end of the first port. A second seal on a second side of the piston head is provided for sealing a first end of a second port in the pilot valve housing.

DETAILED DESCRIPTION

Figure 1:
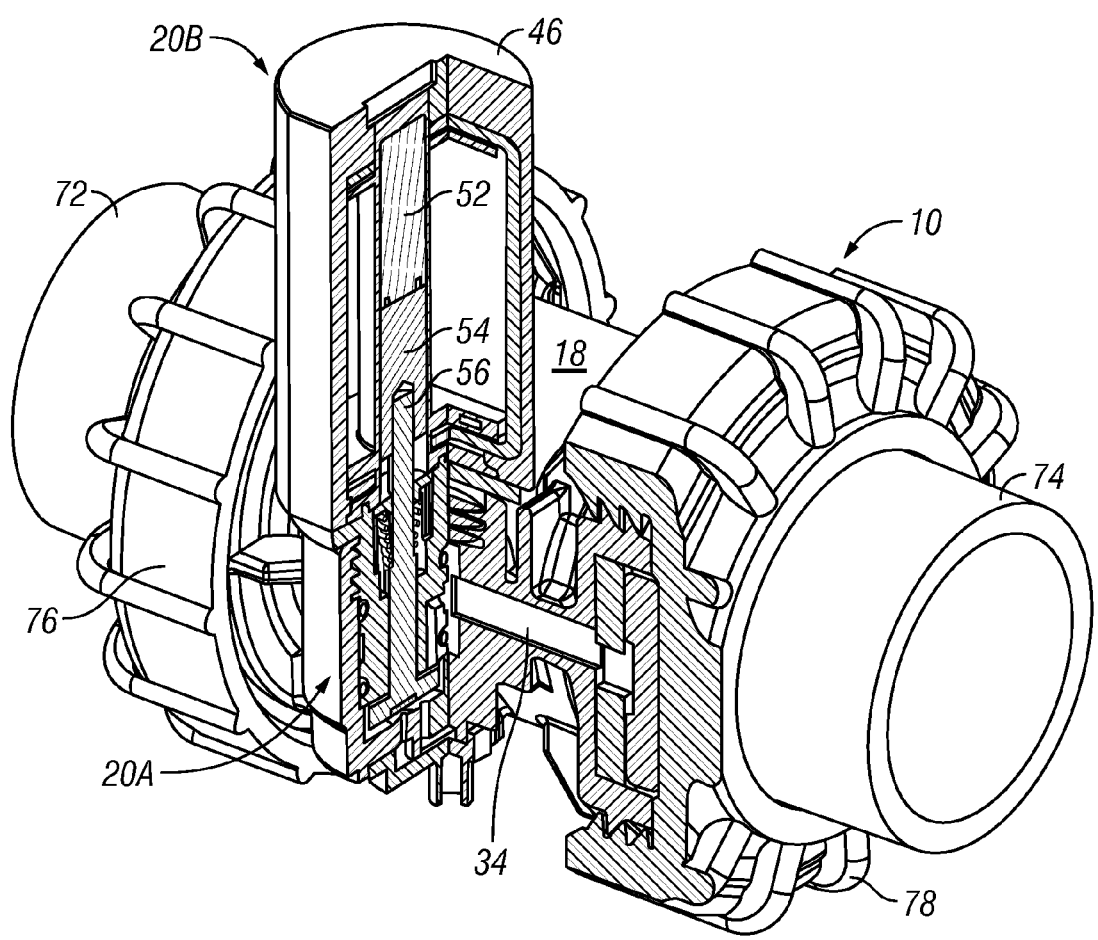
FIG. 1 is a fragmentary isometric view of a sleeve valve incorporating a three-way solenoid actuated pilot valve in accordance with an embodiment of the present invention. The coil of the solenoid is not illustrated in this view.
Figure 2:
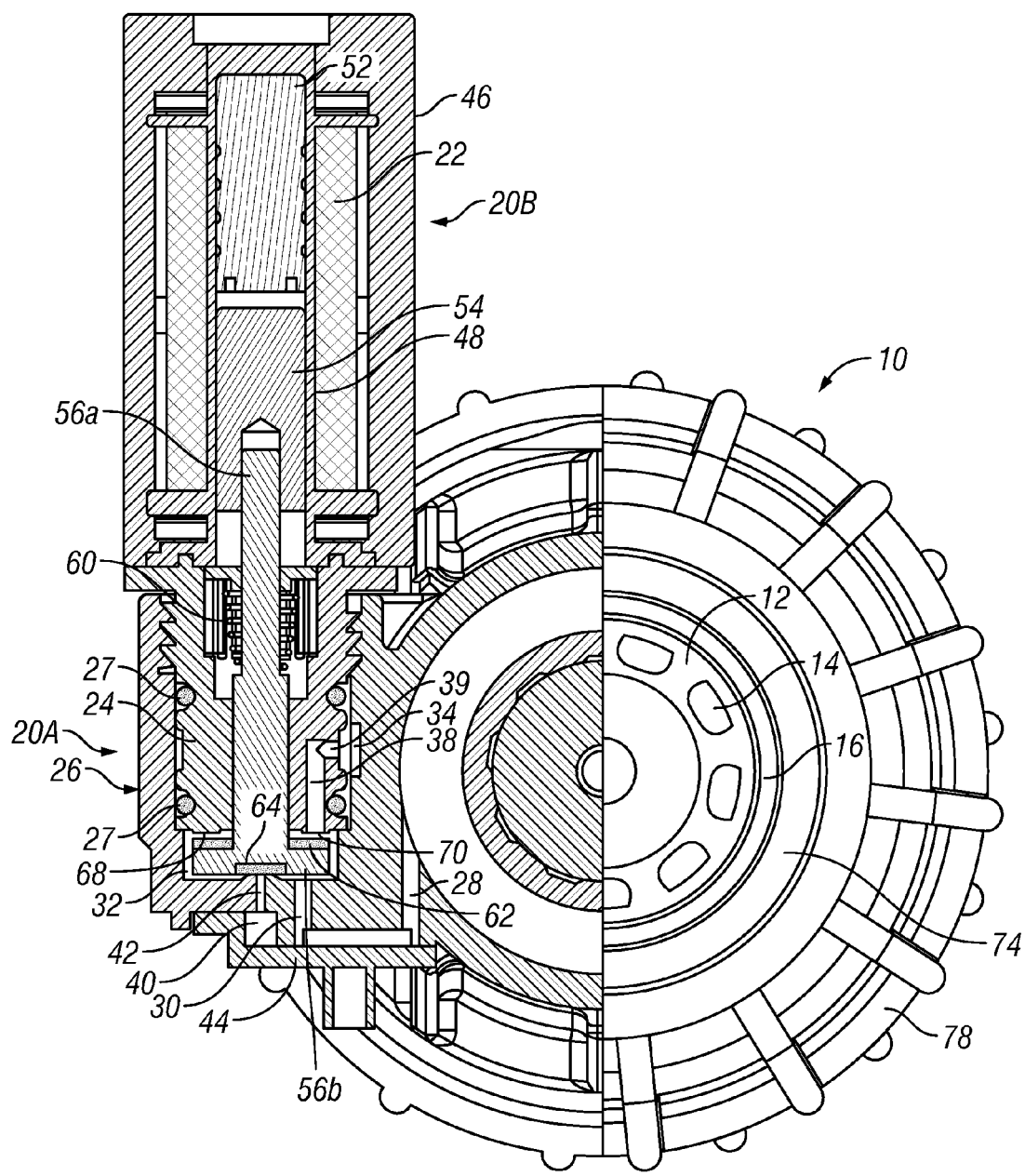
FIG. 2 is an enlarged cross sectional view of a sleeve valve of FIG. 1 illustrating the pilot valve in its valve closed position. The coil of the solenoid is illustrated diagrammatically in this view.

A sleeve valve 10 (FIG. 1) includes a mandrel 12 (FIG. 2) with a plurality of slots 14. A generally cylindrical elastomeric sleeve 16 surrounds the mandrel 12. A generally cylindrical rigid sleeve valve housing 18 (FIG. 1) surrounds the elastomeric sleeve 16 and defines a control chamber (not illustrated) between the elastomeric sleeve 16 and the sleeve valve housing 18 (FIG. 1). A pilot valve 20A is mounted to the sleeve valve housing 18 for opening and closing the sleeve valve 10 by turning ON and OFF a low voltage AC control signal to a non-latching solenoid 20B. The twenty-four volt AC signal is applied via a pair of wires (not illustrated)

connected between a coil 22 (FIG. 2) of the solenoid 20B and an irrigation controller (not illustrated). A generally cylindrical end cap 24 of the pilot valve 20A has male threads so that it can be connected to the sleeve valve housing by screwing it into a female threaded pilot valve housing 26 integrally formed with the sleeve valve housing 18. The longitudinal axis of the pilot valve housing 26 is substantially orthogonal to the longitudinal axis of the sleeve valve housing 18. Upper and lower O-rings 27 are seated in external grooves formed in the end cap 24 and are deformed by the inner walls of the pilot valve housing 26 to provide a water-tight seal. By way of example, the elastomeric sleeve 16 may be molded from material such as EPDM, PVC or silicone and the rigid housing 18, end cap 24, and pilot valve housing 26 may be molded from material such as ABS plastic.

Figure 3:
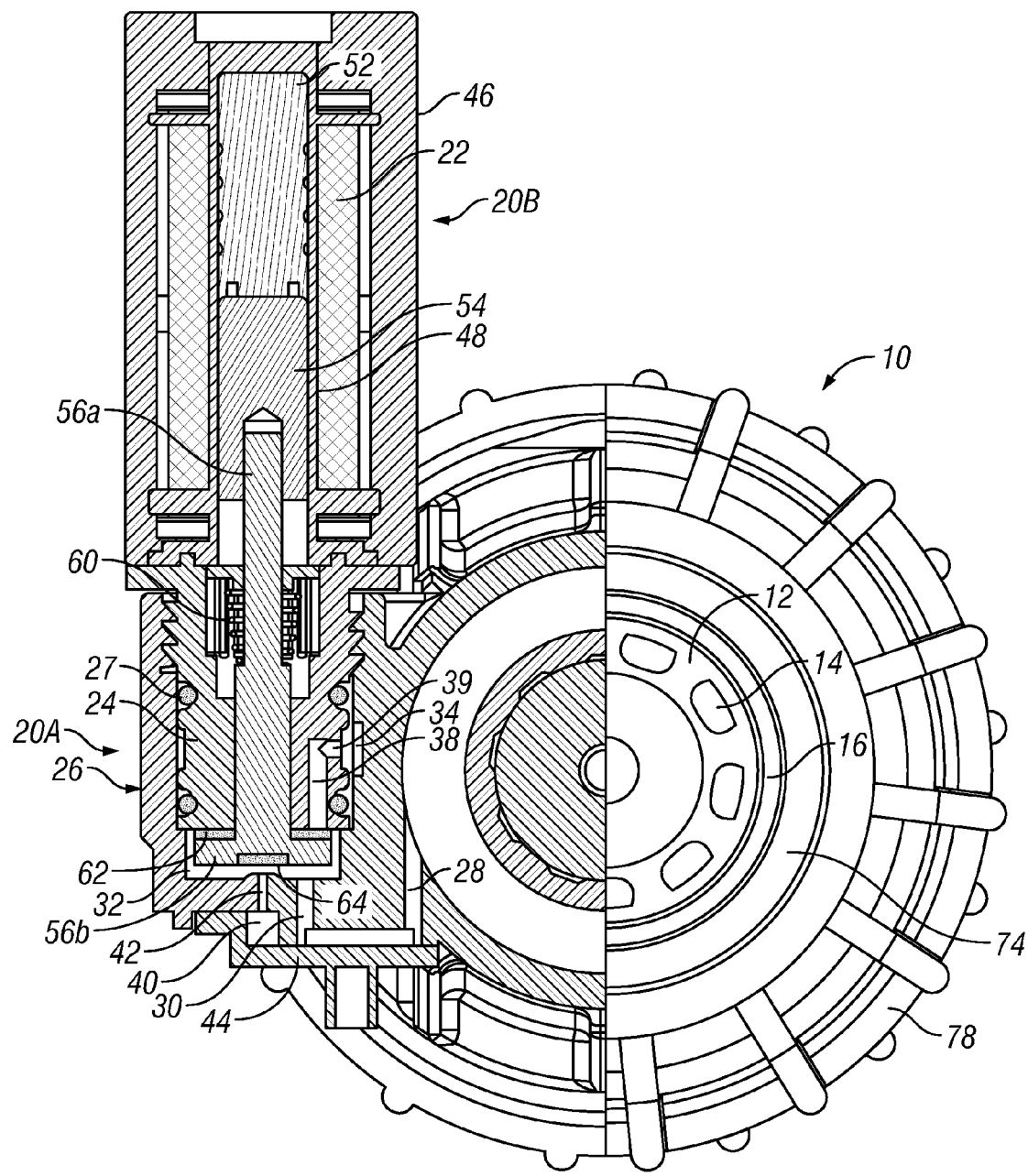
FIG. 3 is a view similar to FIG. 2 illustrating the pilot valve in its open position.
Figure 5:
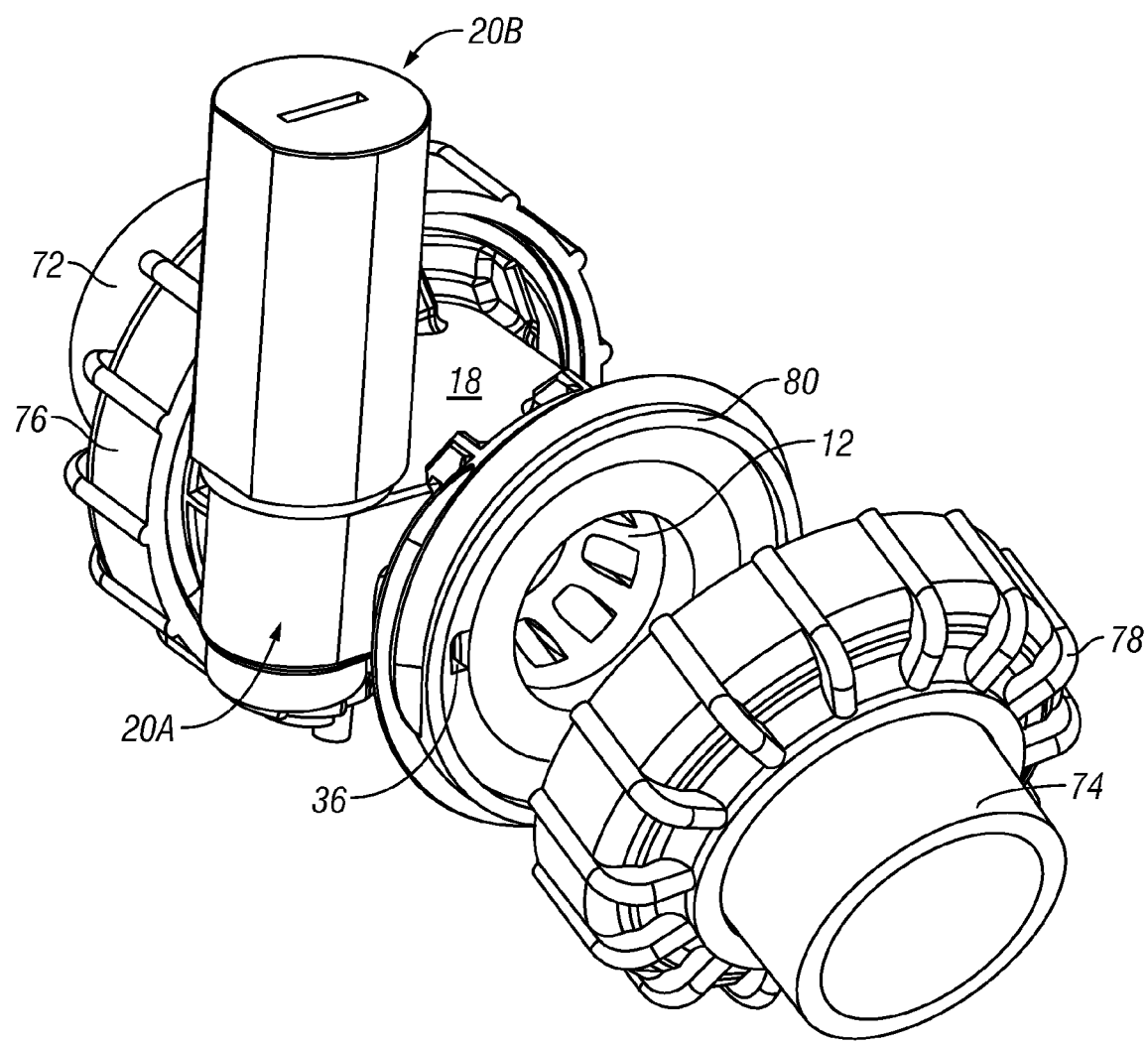
FIG. 5 is an isometric view of the sleeve valve of FIG. 1 with one of its end caps unscrewed to reveal the inlet of the passage formed in the sleeve valve housing that leads to the pilot valve chamber.

The function of the pilot valve 20A is to supply pressurized liquid to, and vent pressurized liquid from, the control chamber of the sleeve valve 10. A passage 28 (FIG. 2) formed in a wall of the sleeve valve housing 18 connects with a port 30 formed in the pilot valve housing 26. The port 30 connects with a pilot valve chamber 32 formed inside the pilot valve housing 26. A passage 34 (FIG. 1) formed in the sleeve valve housing 18 and the pilot valve housing 26 connects an inlet 36 (FIG. 5) of the sleeve valve housing 18 to a port 38 (FIG. 2) in the end cap 24 which in turn connects to the pilot valve chamber 32. The port 38 has a second end that opens at 39 on a side surface of the end cap 34. A relief passage 40 also formed in the sleeve valve housing 18 connects to a port 42 (FIG. 2) in pilot valve housing 26 which in turn connects to the pilot valve chamber 32. To simplify injection molding of the sleeve valve housing 18, a cover 44 (FIGS. 2 and 3) is attached via suitable adhesive or sonic welding to the sleeve valve housing 18 to form passages 28 and 40. When the sleeve valve 10 is opened pressurized water from the control chamber between the elastomeric sleeve 16 and housing 18 is released to the exterior of the sleeve valve 10 via relief passage 40 which terminates in a side opening (not illustrated).

Figure 4:
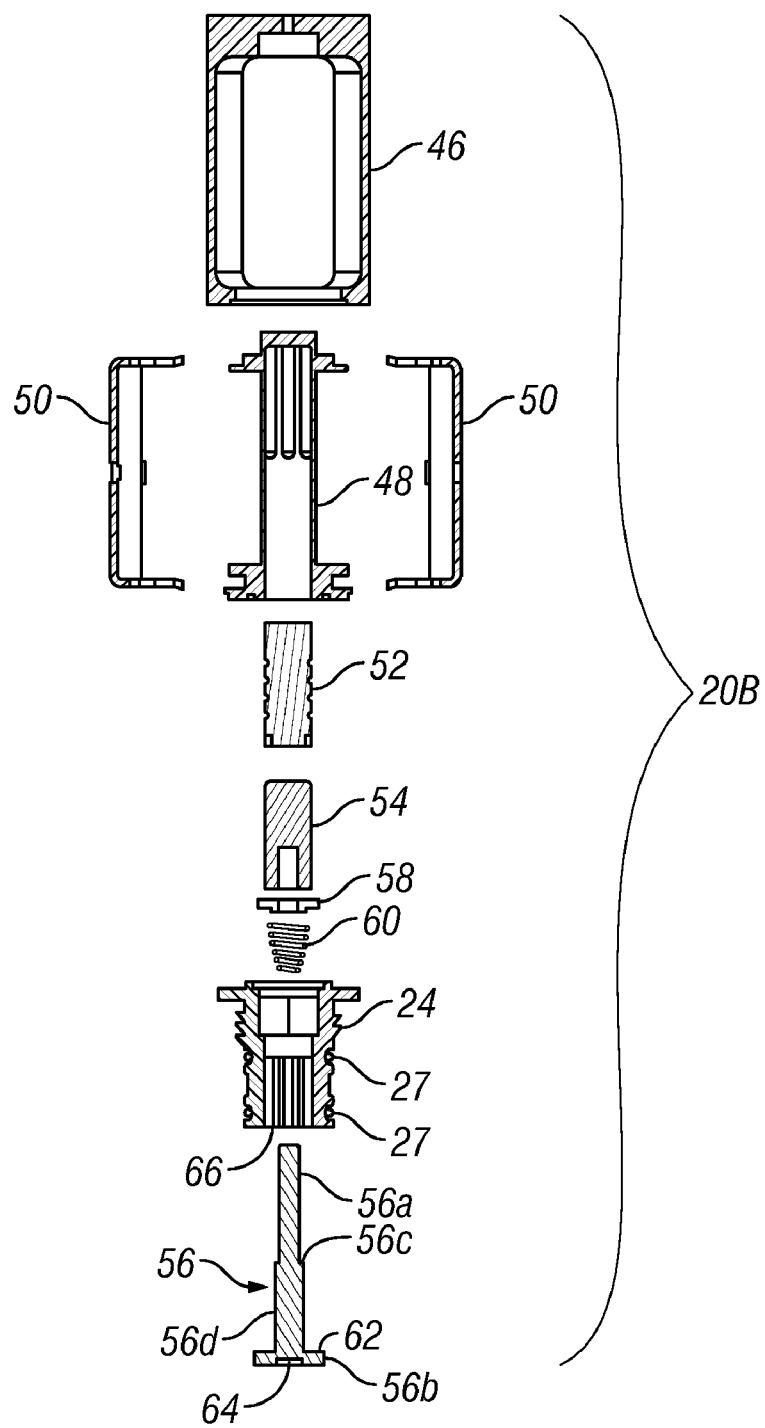
FIG. 4 is an enlarged exploded sectional view of the solenoid portion of the pilot valve of FIG. 1.

The non-latching solenoid 20B (FIG. 1) of the pilot valve 20 has a construction similar to that disclosed in the aforementioned U.S. Pat. No. 5,979,482, the entire disclosure of which is hereby incorporated by reference. Referring to FIG. 4, the solenoid 20B includes a main outer cylindrical shell or housing 46, a central spool 48 and a pair of yokes 50 that surround the coil 22 (not visible in FIG. 4) and enhance the magnetic field generated by the coil 22. The region inside the housing 46 surrounding the coil is filled with a suitable potting compound (not illustrated). The solenoid 20B also includes a pole piece 52 that is secured in a fixed position within the spool 48 at one end of the spool 48. A cylindrical ferrous core plunger 54 acts as an armature and is dimensioned for precision reciprocation inside of the spool 48 beneath the pole piece 52. A piston 56 has a shaft 56a whose upper end is secured in a bore in one end of the plunger 54. The lower end of the piston shaft 56a is connected to a piston head 56b. The end cap 24 is secured to the lower end of the housing 46. A cylindrical sleeve 58 mounted inside the end cap 24 also abuts the lower end of the housing 46 and has a bore for receiving and guiding the piston shaft 56a. A coil spring 60 surrounds that sleeve 58 and is compressed between a shoulder 56c of the piston and a radial flange of the sleeve 58. The plunger 54 and piston 56 are normally in their lower extended positions illustrated in FIG. 2 in which the sleeve valve 10 is closed when the coil 22 is not energized. When the coil 22 is energized, the plunger 54 and piston 56 move upwardly to their raised retracted positions illustrated in FIG. 3 in which the sleeve valve 10 is open. When the plunger 54 and piston 56 are retracted, the coil spring 60 is compressed.

The coil spring 60 ensures that the plunger 54 and piston 56 move to their lower extended positions when the coil 22 is de-energized.

The diameter of the lower segment 56d of the piston shaft 56a (FIG. 4) that is connected to the piston head 56b is greater than the diameter of the upper segment of the shaft 56a that connects the piston 56 to the plunger 54. A first seal 62 (FIG. 2) in the form of an elastomeric ring surrounds the piston shaft 56a and is secured to the upper side or end of the piston head 56b. The seal 62 seals the lower end of the port 38 in the end cap 24 when the solenoid 20B is energized. A second seal 64 in the form of an elastomeric disk is secured in a circular recess formed in the lower side or end in the piston head 56b and seals the port 42 when the solenoid 20B is de-energized. Advantageously, no seal is required between the piston shaft 56a and the end cap 24. The longitudinal axis of a bore 66 through the end cap 24 and the longitudinal axis of the port 38 are parallel. The longitudinal axis of the port 42 is co-axial with the longitudinal axis of the bore 66. The lower end of the port 38 opens on the end surface of the end cap 24. The lower end of the port 38 is spaced laterally from the bore 66. The upper end of the port 38 opens on a side surface of the end cap 24. The end surface of the end cap 24 has a first land 68 (FIG. 2) that is spaced laterally from (and radially outward of) the bore 66. The port 38 exits through a second land 70 formed on the end surface of the end cap 24. The seal 62 engages the land 70 to provide a water-tight seal that closes the lower end of the port 38 when the solenoid 20B is energized. The land 68 helps stabilize seal 62 and keep it perpendicular to the longitudinal axis of the solenoid 20B.

The overall operation of the sleeve valve 10 can now be described. When the solenoid 20B is not energized, spring 60 forces piston 56 downwardly to its extended position illustrated in FIG. 2. In this position, seal 64 closes port 42 and seal 62 is disengaged from land 70, opening port 38. Pressurized water from inlet 36 travels through passage 34, through port 38 and into pilot valve chamber 32. This water then travels from the pilot valve chamber 32, through port 30 and passage 28 into the control chamber of the sleeve valve 10 between the sleeve valve housing 18 and the elastomeric sleeve 16. Pressure builds up inside the sleeve valve control chamber, forcing the elastomeric sleeve 16 inwardly and sealing the slots 14 in mandrel 12. The flow through the main flow passage of the sleeve valve 10 is now stopped and the sleeve valve 10 is in its closed state. When the solenoid 20B is energized, the piston 56 is forced upwardly to its retracted position illustrated in FIG. 3. The seal 62 closes off port 38, shutting off the source of pressurized water from the inlet 36 through the passage 34. The seal 64 is disengaged from the port 42. Water from the control chamber inside the sleeve valve 10 to be expelled through passages 28 and 30 and into the pilot valve chamber 32. This water then exits the pilot valve 20A via port 42 and relief passage 40. The elastomeric sleeve 16 expands and water flows through the main flow passage of the sleeve valve 10 which is now in its open state.

Port 38 is a high pressure port and is off-center from, but parallel to the longitudinal axis of the solenoid 20B and its coil 22. The lower segment of the piston shaft 56a has a relatively large diameter compared with the relatively small diameter of such shafts in conventional three-way solenoid actuated pilot valves. The piston head 56b and its upper seal 62 overhang the off-center port 38. In conventional three-way solenoid actuated pilot valves, the shaft of the piston has been a delicate pin. The diameter of the piston head 56b and the diameter of the lower piston shaft segment 56d do not have to be minimized as is the case with conventional three-way solenoid actuated pilot valves. The port 42 is the atmospheric port and is centered relative to the longitudinal axis of the solenoid 20B and its coil 22. The advantage of the pilot valve 20A is that it can be opened and closed with relatively low power compared to conventional three-way solenoid actuated pilot valves. Moreover, it is easier to assemble the larger piston 56 and related components of the pilot valve 20A.

The sleeve valve 10 includes smooth cylindrical end connections 72 and 74 (FIG. 1) for joining the valve with pipe segments (not illustrated) using suitable solvent welding material. Female threaded end caps 76 and 78 are used to secure the end connections 72 and 74 to male threaded ends 80 (FIG. 5) of the sleeve valve housing 18. Together the female threaded end caps 76 and 78 and the corresponding male threaded ends 80 (FIG. 5) of the sleeve valve housing 18 provide what is known in the plumbing trades as unions. The inlet 36 opens into an annular chamber formed when the end cap 78 is screwed over the end connection 74 onto the male threaded end 80 of the sleeve valve housing 18. A surface of the sleeve valve housing 18 has radially extending grooves (not illustrated) that filter grit to prevent it from clogging the small ports of the pilot valve housing 26 and end cap 24. The smooth end connections 72 and 74 could be replaced with threaded or barbed end connections. [See the co-pending U.S. patent application incorporated by reference above for further details.]

While I have described an embodiment of my solenoid actuated pilot valve, modifications and variations thereof will occur to those skilled in the art. For example, the port 42 could also be off-center. The design of the solenoid 20B could be widely varied, such as by constructing it as a latching solenoid. The size, shape and locating of the various ports and passages could be varied to fulfill particular needs. The end cap 24 need not be a separate piece but could be integrally formed with housing 46. The piston 56 could be replaced with an member that has a reciprocable longitudinally extending member connected to a laterally projecting member for supporting two seals on opposite sides thereof. For example, such a structure could be provided by an L-shaped element similar in configuration to an Allen wrench. One of the seals could be located on the upper side of the laterally projecting member whereas the other seal could be located on the underside of the longitudinally extending member or on the underside of the laterally projecting member. The seals 62 and 64 could be over-molded elastomeric material, or they could be non-elastomeric material such as regions of a laterally projecting member. It will be further understood that while the pilot valve housing 26 may be manufactured as a part of the sleeve valve housing 18, a pilot valve sub-assembly including the solenoid 20B with its specially designed end cap 24, piston 56 and seals 62 and 64 can be separately manufactured as a replacement part. Therefore, the protection afforded my invention should only be limited in accordance with the following claims.

I claim:

1. A three-way solenoid actuated pilot valve, comprising:
    a solenoid having a piston with a laterally extending piston head connected to a shaft longitudinally reciprocable through a bore in an end of the solenoid and a first port with a first end opening through the end of the solenoid laterally spaced from the bore so that it is sealed and unsealed by the piston head upon reciprocation of the piston; and
    a pilot valve housing for receiving the end of the solenoid and defining a pilot valve chamber between the end of the solenoid and the pilot valve housing, the pilot valve housing having a second port that communicates with the pilot valve chamber and is located so that it is sealed and unsealed by the piston head upon reciprocation of the piston, and a third port formed in the pilot valve housing that also communicates with the pilot valve chamber.

2. The pilot valve of claim 1 wherein a second end of the first port opens on a side surface of the end of the solenoid.

3. The pilot valve of claim 1 and further comprising a first seal in the form of an elastomeric ring that surrounds the shaft of the piston that seals and unseals the first end of the first port upon reciprocation of the piston and a second seal in the form of an elastomeric disk secured to an underside of the piston head that seals and unseals the second port upon reciprocation of the piston.

4. The pilot valve of claim 1 wherein a first axis of the bore and a second axis of the first port are substantially parallel.

5. The pilot valve of claim 4 wherein a third axis of the second port is co-axial with the first axis of the bore.

6. A three-way solenoid actuated pilot valve, comprising:
    a solenoid having a longitudinally extending member with a laterally projecting member, the longitudinally extending member being reciprocable through a bore in an end of the solenoid, and the solenoid having a first port with a first end opening through the end of the solenoid laterally spaced from the bore so that it is sealed and unsealed by the laterally projecting member upon reciprocation of the longitudinally extending member; and
    a pilot valve housing for receiving the end of the solenoid and defining a pilot valve chamber between the end of the solenoid and the pilot valve housing, the pilot valve housing having a second port that communicates with the pilot valve chamber and is located so that it is sealed and unsealed by the laterally projecting member upon reciprocation of the longitudinally extending member, and a third port formed in the pilot valve housing that also communicates with the pilot valve chamber.

7. The pilot valve of claim 6 wherein a second end of the first port opens on a side surface of the end of the solenoid.

8. The pilot valve of claim 6 and further comprising a first elastomeric seal that seals and unseals the first end of the first port upon reciprocation of the longitudinally extending member and a second elastomeric seal an underside of the laterally projecting member that seals and unseals the second port upon reciprocation of the longitudinally extending member.

9. The pilot valve of claim 6 wherein a first axis of the bore and a second axis of the first port are substantially parallel.

10. The pilot valve of claim 9 wherein a third axis of the second port is co-axial with the first axis of the bore.

* * * * *